(12) United States Patent
Jorgensen

(10) Patent No.: US 7,169,366 B2
(45) Date of Patent: Jan. 30, 2007

(54) SYSTEM AND METHOD FOR EXPOSING AN OBJECT TO AN ELECTRICAL DISCHARGE

(76) Inventor: Morten Jorgensen, 4676 S. Shore Ave., Slinger, WI (US) 53086

( * ) Notice: Subject to any disclaimer, the term of this patent is extended or adjusted under 35 U.S.C. 154(b) by 372 days.

(21) Appl. No.: 10/462,372

(22) Filed: Jun. 16, 2003

(65) Prior Publication Data

US 2004/0251246 A1    Dec. 16, 2004

(51) Int. Cl.
  *B01J 19/08* (2006.01)
(52) U.S. Cl. .................. 422/186.05; 118/638
(58) Field of Classification Search .......... 422/186.05; 118/638
  See application file for complete search history.

(56) References Cited

U.S. PATENT DOCUMENTS

| | | | |
|---|---|---|---|
| 3,021,270 A | 2/1962 | Tarbox et al. | .............. 204/168 |
| 3,385,966 A | 5/1968 | Rosenthal | .................. 250/49.5 |
| 3,484,363 A * | 12/1969 | Williams | ................ 422/186.05 |
| 5,173,046 A | 12/1992 | Walker | ........................ 432/121 |
| 5,426,557 A * | 6/1995 | Blitshteyn et al. | .......... 361/225 |
| 5,458,714 A | 10/1995 | Brandt et al. | ................ 156/237 |
| 5,472,747 A | 12/1995 | Poo et al. | .................... 427/536 |
| 5,650,028 A | 7/1997 | Brandt et al. | .................. 156/64 |
| 6,007,784 A | 12/1999 | Jorgensen | .............. 422/186.05 |

* cited by examiner

*Primary Examiner*—Kishor Mayekar
(74) *Attorney, Agent, or Firm*—Foley & Lardner LLP

(57) ABSTRACT

Methods and systems are configured to expose an object to an electrical discharge. The system includes a conveyor that conveys the object, a guide that guides the object, and an electrode that provides an electrical discharge. The guide is typically set to guide the object laterally with respect to the direction of the conveyor. The guide is generally used to place an object at a predetermined distance from the electrode. Also, the system may include multiple electrodes. The plural electrodes may be used to treat multiple sides of the object. Also, the electrodes may be positioned such that they are not coplanar with the conveyor. The system is suitably used to treat hollow objects which are in filling positions.

30 Claims, 8 Drawing Sheets

SYSTEM AND METHOD FOR EXPOSING AN OBJECT TO AN ELECTRICAL DISCHARGE

BACKGROUND

In the field of exposing an object to an electrical discharge, one known method is corona treatment. Corona treatment is the exposure of an object to a corona discharge, which is generated by exposing atmospheric air to different voltage potentials. A corona is the faint glow enveloping from an electrode in a corona discharge, often accompanied by streamers directed toward a second electrode. When a plastic substance is placed under the corona discharge, the electrons generated in the discharge impact on a surface of the substance to be treated with sufficient energy to break the molecular bonds on the treatment surface. Oxidation of the treatment surface increases the surface energy, allowing for better wetting by liquids and promoting adhesion. The oxidation results in an improved surface tension, which advantageously provides for improved bonding of liquids, adhesives, and inks to plastic surfaces and other surfaces.

One use for corona treatment is in treating the surfaces of plastic containers which contain household (and other) products, such as shampoo, cleaner, oil, paint, etc. One challenge in treating these containers is that the containers come in various shapes and sizes. Therefore, it would be advantageous to have a system for exposing a wide variety of extrusion or injection blow molded containers to an electrical discharge without requiring adjustment of the treatment system.

In one prior method of treating polyolefin objects, a conveyor belt provides an object to an electrical discharge apparatus for treatment. However, this system requires an alignment plate and an adjustable guiding arm. This system has the disadvantage of requiring operator adjustment to accommodate different treatment processes.

Also, many hollow objects, such as containers, are conveyed along a conveyor belt, which hollow objects will later be filled with a substance. Hollow objects leaving the corona system would preferably be in a filling position such that they may be more easily handled by a filling system that may be located further down a production line. For many hollow objects, this means that at least a relevant portion of an opening to the hollow object is substantially upright (i.e. within about 30° of being perpendicular to the conveyor).

Accordingly, what is needed is an improved system and method for exposing an object to an electrical discharge. Further, there is a need for such a system which does not require operator adjustments to accommodate various sizes and shapes of objects to be treated. Further still, what is needed is an improved guide having less rapid wear of the guide (due to the corona discharge between the guide and the electrode) and more optimal treatment of the object to be treated. Further still, what is needed is an improved wire electrode for optimal treatment of the object to be treated. Further still, what is needed is an improved system and method of providing the object at a predetermined distance from the electrode with better reliability than prior systems. Further still, what is needed is an improved system that can apply an electrical discharge to bottles which are upright.

The teachings hereinbelow extend to those embodiments which fall within the scope of the appended claims, regardless of whether they accomplish one or more of the above-mentioned needs.

SUMMARY

One embodiment is directed to a conveyor system for exposing an object to an electrical discharge to increase the surface tension of a surface of the object. The system includes a conveyor configured to convey the object, a guide configured to guide the object laterally with respect to a direction of movement of the conveyor, a first electrode configured to provide an electrical discharge to a first side of the object, and a second electrode configured to provide an electrical discharge to a second side of the object.

Another embodiment provides a conveyor system for exposing an object to an electrical discharge to increase the surface tension of a surface of the object. The system includes a conveyor configured to convey the object and having a direction of movement, a guide having a surface disposed at a first angle relative to the direction of movement, and an electrode configured to provide an electrical discharge. The surface of the guide guides the object laterally with respect to the direction of movement. The electrode is positioned at a second angle which is different than the first angle.

Another embodiment relates to a method for exposing a hollow object to an electrical discharge to treat a surface of the hollow object. The method comprises guiding the hollow object in a direction lateral to a direction of movement of a conveyor, providing the hollow object to an electrode located in a channel while an opening of the hollow object is in a filling orientation, and exposing a side of the hollow object to an electrical discharge.

Another embodiment is directed to a conveyor system for exposing an object to an electrical discharge to increase the surface tension of a surface of the object. The system includes a conveyor configured to convey the object, a guide configured to reposition the object on the conveyor at a predetermined distance from the electrode, and an electrode configured to provide an electrical discharge. The conveyor and the electrode are not coplanar.

Another embodiment provides a conveyor system for exposing an object to an electrical discharge to increase the surface tension of a surface of the object. The system includes a conveyor configured to convey the object, a first guide having a surface at an angle which is fixed with respect to a direction of movement of the conveyor, a second guide having a surface at an angle which is fixed with respect to the direction of movement of the conveyor, and an electrode configured to provide an electrical discharge. The first guide is configured to guide the object laterally with respect to the direction of movement of the conveyor, and the second guide is also configured to guide the object laterally with respect to the direction of movement of the conveyor. The first guide and the second guide are typically configured to guide the object in opposite lateral directions.

BRIEF DESCRIPTION OF THE DRAWINGS

The invention will become more fully understood from the following detailed description, taken in conjunction with the accompanying drawings, wherein like reference numerals refer to like parts and wherein.

DETAILED DESCRIPTION OF EXEMPLARY EMBODIMENTS

Figure 1:
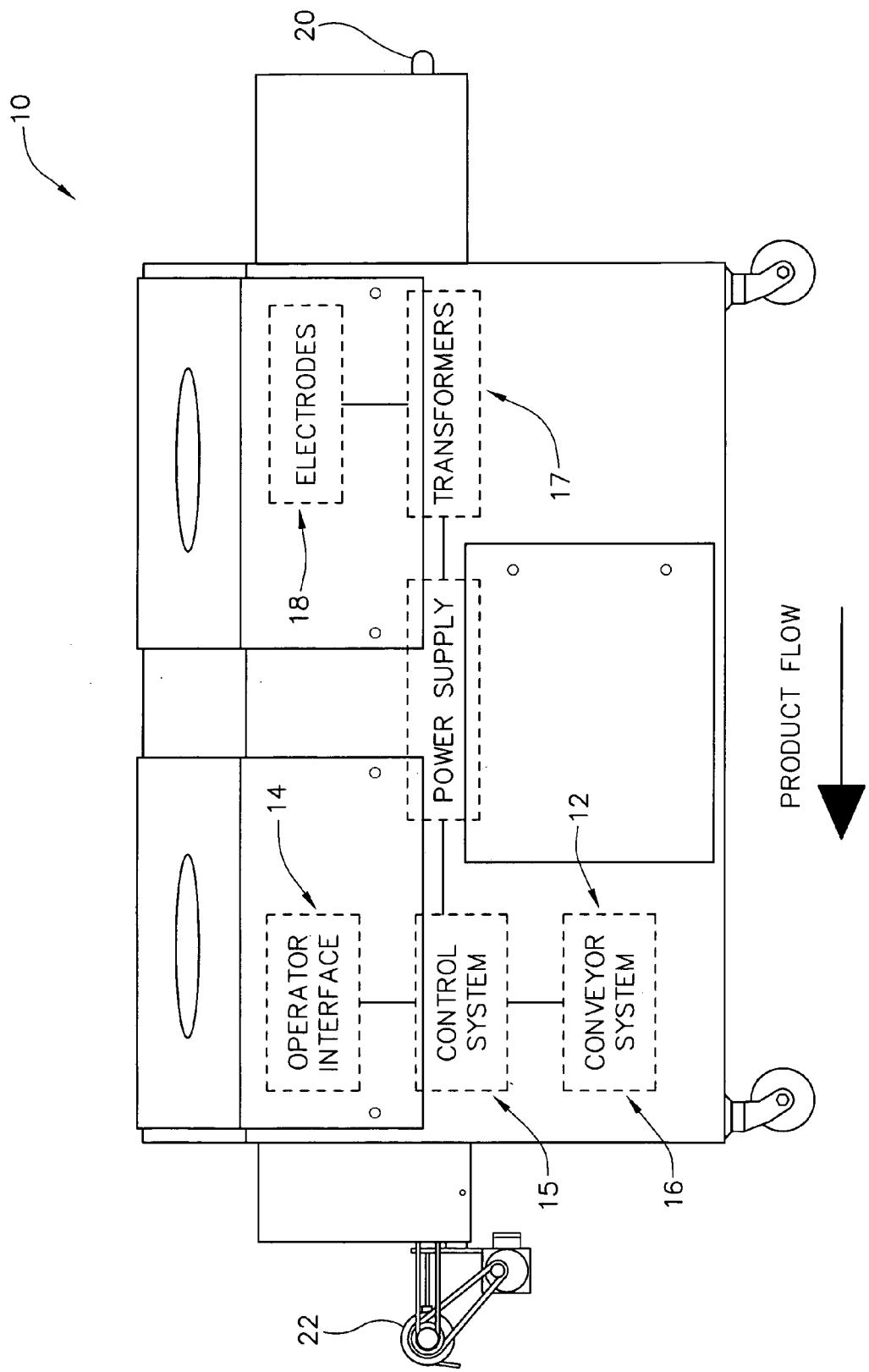
FIG. 1 is a front view of a system for exposing an object to an electrical discharge, according to an exemplary embodiment.

Referring to FIG. 1, a treatment system 10 is shown. Treatment system 10 is a system for exposing an object to an electrical discharge. In this exemplary embodiment, the electrical discharge changes the surface tension of a surface of the object by oxidizing the surface to make the surface receptive to inks, adhesives, etc.

The object can have a treatment surface comprising plastic, such as a polyolefin, polypropylene, polyethylene, PET, etc., a metal, nylon, vinyl, foils, paper, paperboard stock and/or other materials. The object can have one or more of curved or flat surfaces.

The objects to be treated can be cylindrical, having an outside diameter of 1.5 to 2.5 inches (40 mm to 65 mm) and a height of 2 inches (50 mm) to 12 inches (300 mm), or rounded oval or rectangular containers having a width of 1.5 inches to 6 inches (40 mm to 150 mm), a depth of 1 inch to 3.4 inches (25 mm to 85 mm), and a height of 2 inches to 12 inches (50 mm to 300 mm). Alternative sizes and shapes are contemplated such as other square shapes. For example, an alternative embodiment of system 10 can be configured to treat objects having a diameter of twelve inches (300 mm), or more and a height of six inches (150 mm) or more.

Treatment system 10 is designed for convenient installation into molding and/or printing lines and comprises a loading platform 20 and an unloading platform 22. Loading platform 20 is configured to receive objects to be treated and unloading platform 22 is configured to provide treated objects to subsequent manufacturing steps. Treatment system 10 can also be used as a stand-alone workstation.

Referring again to FIG. 1, a plurality of subsystems of treatment system 10 are illustrated in block diagram form. A power supply 12 is configured to receive an input voltage and to provide power to one or more high voltage transformers 17. An operator interface 14 is coupled to a control system 15, which is coupled to at least one of power supply 12 and conveyor system 16 to allow an operator or user to control the starting and stopping of conveyor system 16 and to control other functions of treatment system 10. Operator interface can include buttons, switches, etc. and also output devices, such as a display, lights, a buzzer, etc.

Power supply 12 is configured to provide power to transformer circuit 17. Transformer circuit 17 can comprise one, two or four transformers in alternate embodiments. Transformer circuit 17 provides high voltage power to electrodes 18, which can be between about 6–60 kHz electricity at between 10–100 kV. Treating system 10 may use about 3 kW per hour. Electrodes 18 are disposed in the vicinity of the objects to be treated to generate a corona or other electrical discharge to treat the surface of the objects. In this embodiment, electrodes 18 comprises a first wire electrode 32a and counter electrode 32b and a second wire electrode 34a and counter electrode 34b (see FIG. 3). Transformer circuit 17 comprises a first transformer configured to provide high voltage power to both wire electrodes 32a, 34a and a second transformer configured to provide high voltage power to both counter electrodes 34a, 34b out of phase with the power provided to wire electrodes 32a, 34a. The voltages on each transformer can be the same or different. Alternatively, in a one-transformer embodiment, the transformer can provide power to both wire electrodes 32a, 34a, while the other electrode is on ground potential. In a further alternate embodiment, each of electrodes 32a, 32b, 34a, and 34b can be driven by a separate transformer, wherein electrodes 32a, 32b are provided high voltage power out of phase with high voltage power provided to electrodes 34a, 34b. Other configurations are contemplated.

Electrodes 18, transformer circuit 17 and power supply 12 are configured to provide treatment of up to 70 milliNewtons/Meter (mN/M or dyne/cm), depending on the application. Control system 15 (e.g., comprising one or more digital and/or analog control components, such as, a microprocessor, a microcontroller, an application-specific integrated circuit, etc.) is configured to control conveyor system 16 with a speed of up to 40 feet (12 m) per minute. Alternatively, conveyor system 16 can be operated at speeds greater than 40 feet per minute.

Figure 2:
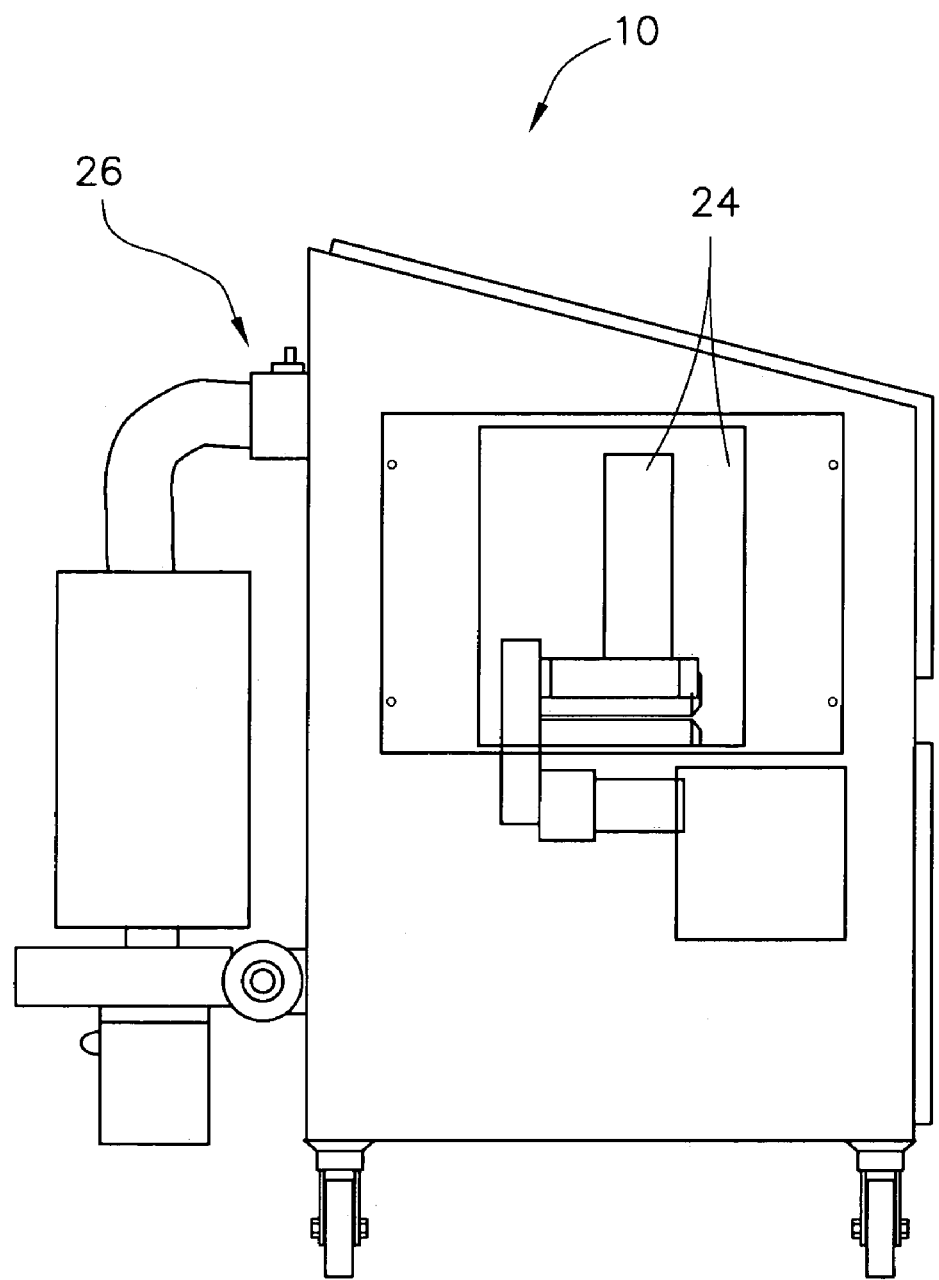
FIG. 2 is a right side view of the system of FIG. 1, according to an exemplary embodiment.

Referring now to FIG. 2, a right side view of treatment system 10 is shown, illustrating an intake aperture 24 configured to receive the objects to be treated. An ozone exhaust and filter connection and/or system 26 is provided to reduce the ozone level in and around treatment system 10.

Figure 3:
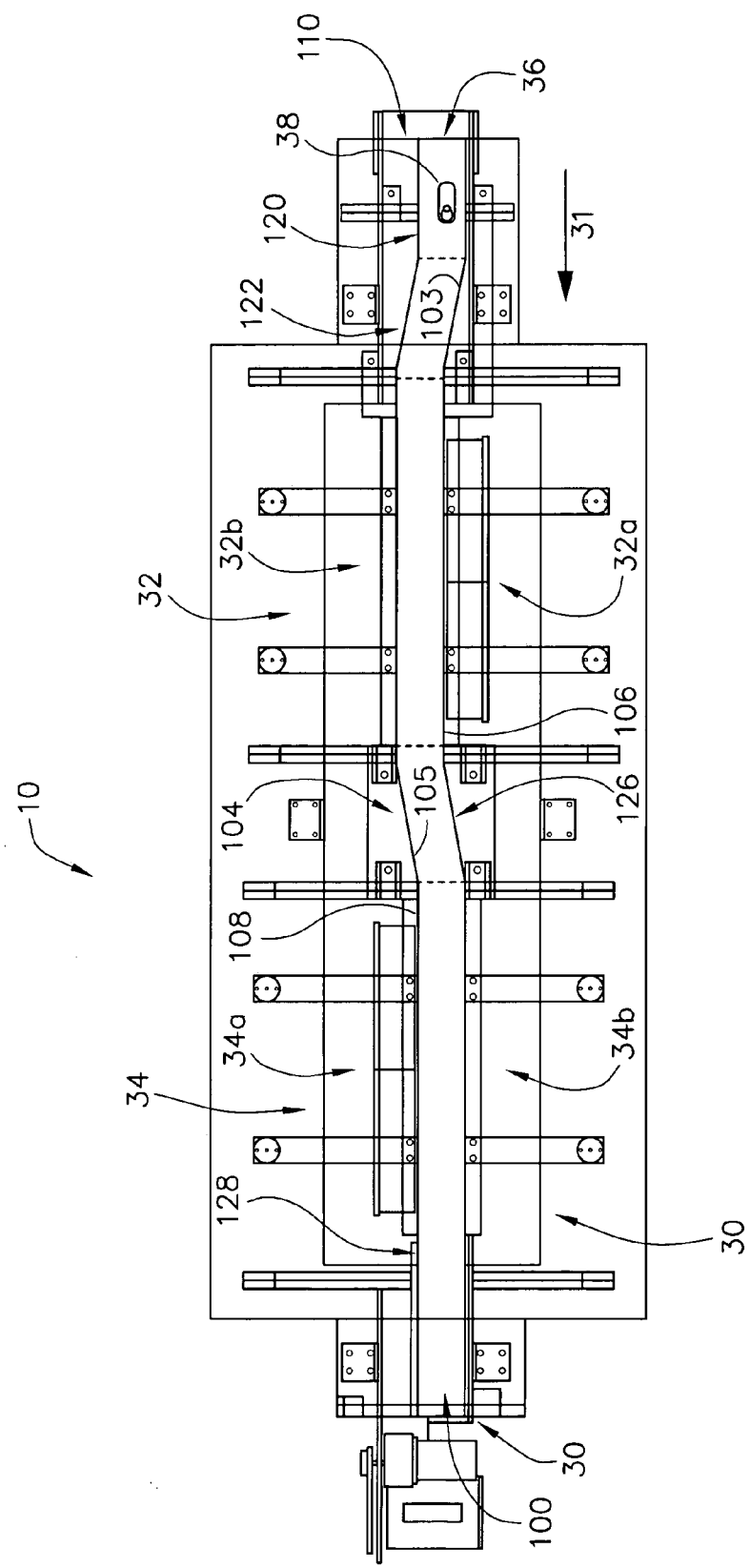
FIG. 3 is a cut-away overhead view of the system of FIG. 1, according to an exemplary embodiment.

Referring to FIG. 3, treatment system 10 is shown in a cutaway view. In this exemplary embodiment, treatment system 10 includes a conveyor system comprising a conveyor 30, first and second electrode pairs 32, 34 (e.g., both electrodes 32a, 32b and 34a, 34b of each electrode pair 32, 34 having the same or similar power level as the other electrode of the electrode pair, 180 degrees out of phase), and a guide system 36 defining a channel 100.

Treatment system 10 includes a first electrode pair 32a, 32b disposed on a first side of channel 100 and a second electrode pair 34a, 34b disposed on a second side of channel 100. Guide system 36 include positioning guides 102, 104 and electrode guides 106, 108. Positioning guides 102, 104 each include a respective surface 103, 105 disposed at about a 30 degree angle with respect to a direction of movement 31 of conveyor 30. Surfaces 103, 105 of positioning guides 102, 104 can be disposed at any number of angles, but are preferably at an angle of about 10 to 60 degrees with respect to the direction of movement 31 of conveyor 30.

Electrode pairs 32, 34 are located along electrode guides 106, 108 respectively. In this embodiment, electrode guides 106, 108 are at a different angle with respect to the direction of movement 31 of conveyor 30 than the surfaces 103, 105 of positioning guides 102, 104 respectively. Electrode guides 106, 108 are substantially parallel (within about 15°) to the direction of movement of conveyor 30. Other orientations are also possible for any of the guides in guide system 36. The guides in guide system 36 are preferably in set positions such that they are not easy to manually adjust. More preferably, guide system 36 are in fixed positions which are either permanently set or are difficult to adjust.

An object 38 enters treatment system 10 at opening 110, entering a first portion 120 of channel 100. Object 38 passes along positioning guide 102 in a second portion 122 of channel 100 which guides or repositions object 38 laterally to the right (as determined when facing the direction of movement 31). This provides object 38 in the vicinity of electrode 32a of electrode pair 32 as object 38 passes along electrode guide 106 in a third portion 124 of channel 100.

Object 38 then passes along positioning guide 104 in a fourth portion 126 of channel 100. Surface 105 of positioning guide 104 guides object 38 laterally to the left, the opposite direction of positioning guide 102. This provides object 38 in the vicinity of electrode 34*a* of electrode pair 34 as object 38 passes along electrode guide 108 in a fifth portion of channel 100. As object 38 passes through third portion 124 and fifth portion 128 object 38 is at about a first and a second predetermined distance from electrodes 32*a*, 34*a*, respectively. This predetermined distance is typically between 0.020 inches and 1.00 inches, and is generally at about 0.25 inches. The size and thickness of the object, the length of a treatment side 61, the power of the electrodes, and the shape of the object, the material to be treated, and the line speed may all effect the size of the predetermined distance.

Conveyor 30 moves or conveys objects 38 through treatment system 10 and can comprise any of a plurality of conveying or moving mechanisms, such as conveyor belts, actuators, motors, robotic arms, pulleys, air flow or suction devices, rollers, etc. In this exemplary embodiment, conveyor 30 comprises a single conveyor configured to convey objects 38 toward guide system 36 and electrode pairs 32, 34. In an alternate embodiment, conveyor 30 can include a conveyor belt coupled to a suction device, such as a vacuum suction device, configured to draw objects 38 towards the conveyor belt through holes in the conveyor belt to provide improved stability.

Conveyor 30 may further include one or more sub-conveyors configured to perform one or more functions of conveyor 30 and/or additional conveyors which perform other functions. For instance, sub-conveyors and/or additional conveyors may be employed to move objects 38, rotate objects 38, move objects 38 along an unloading platform away from electrode pairs 32, 34, and/or perform some other function with respect to treatment system 10. Each of the conveyors of conveyor 30 may include a corresponding motor, which can be a DC motor, servo motor, drive motor, or other motor, and a conveyor belt or belts. It is understood that different embodiments of conveyor 30 can have one, two, or three conveyors (or more) performing various moving or rotating functions, and that conveyors can include belts or alternative conveying mechanisms, such as, a robotic arm, roller, etc.

According to one advantageous aspect of this embodiment, the conveyor belt of one or more of the conveyors of conveyor 30 may include a plurality of flexible or bendable or stretchable belts. Each belt is flexible and can have urethane in a toroid or "O"-ring shape having a cross-sectional diameter or thickness of approximately one-eighth of an inch, or less than one inch. In this embodiment, conveyor 30 has at least three "O"-ring shaped belts, each belt having a thickness of approximately one-quarter of an inch. Alternative materials can be used. The motor or motors driving conveyer 30 are controlled by control system 15 and operator interface 14 (FIG. 1) to rotate the belts to impart movement on objects 38 through treatment system 10.

In one example, a motor drives a pulley to rotate conveyor belts. The pulley has an open end to allow for easy changing of belts. Furthermore, the stretchability of the belts also provides for easy changing of the belts. Furthermore, belt tensioning and alignment systems are not required in this embodiment. Corona treatment can discolor, damage, or wear away at the belts over a long period of time and, therefore, it is advantageous to have belts which are easily replaceable. In alternative embodiments, conveyor belts can be a conventional one-piece sheet-type belt.

Figure 4:
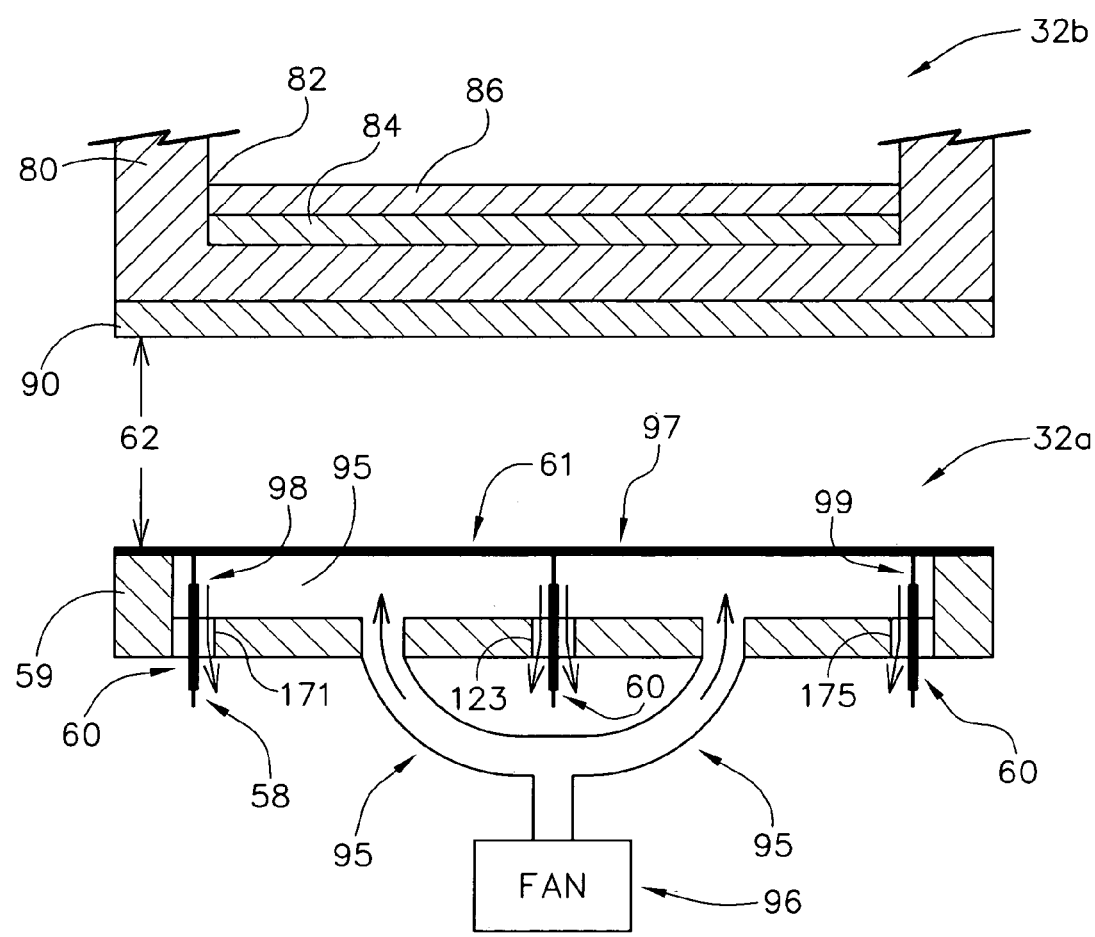
FIG. 4 is a diagram of an electrode pair according to an exemplary embodiment.

Referring to FIG. 4, guide 106 is illustrated, which comprises a wire electrode 58, an insulative base 59 defining a channel 95, and a mask 97 in this embodiment. Guide 108 can be of similar construction to guide 106.

Base 59 can be any type of material such as metal, plastic, porcelain, etc. Advantageously, wire electrode 58 forms a loop or a rectangle having an elongated side with a wire electrode having a cross-sectional diameter of less than 0.25 inches. An electrode having a cross-sectional diameter of less than 0.25 inches is advantageous for treating empty containers with an optimal electrical discharge. Electrodes 32*a*, 34*a* are further coupled to insulators/isolators 60 and to transformers 17 (FIG. 1). Insulators/isolators 60 can be made of silicone. In this exemplary embodiment, wire electrode 58 comprises stainless steel and is manufactured by a cold draw method. The cold draw method comprises providing a stainless steel wire of a predetermined length and cross-sectional diameter and drawing the wire, i.e., providing a pulling force on ends of the wire. The pulled or drawn wire has a greater length and smaller, controlled cross-section diameter and surface finish than before the pulling operation. Preferably, the pulling is done without the use of applied heat. Cold drawn stainless steel wire can be two to ten times the hardness of other stainless steel wires, which makes it more durable and more resistant to scratches. A scratch or imperfection in the wire can result in a high volume of streamers during corona treating which can result in uneven treatment of the object to be treated. The smaller the diameter of wire electrode 58, the easier it is for electrical discharge to release from the electrode with a lower driving voltage.

Another advantageous feature of wire electrode 58 is that it comprises corners 98, 99 which are curved with a large radius, preferably more than 0.25 inches or between 0.25 inches and 3 inches. A sharp edge at corners 98, 99 can result in an intense discharge of electricity, which can result in uneven treatment and can degrade or even melt the dielectric material in electrodes 32*b*, 34*b*.

In this exemplary embodiment, wire electrode 58 has a rectangular shape comprising a treatment side 61 having a length of approximately 24 inches (though it may be greater or less than 24 inches in alternative embodiments). The greater the length of treatment side 61, the faster that objects 38 can be moved across wire electrode 58 by conveyor 30.

Referring still to FIG. 4, fan 96 blows air past wire electrode 58 through channels 95. Some air escapes through aperture 72 (FIG. 5) in mask 97, which makes the corona discharge more uniform and reduces hot discharges. Some air escapes through apertures 171, 173 and 175 in base 59, which reduces or eliminates electrical discharge from wire electrodes 58 to base 59.

Figure 6:
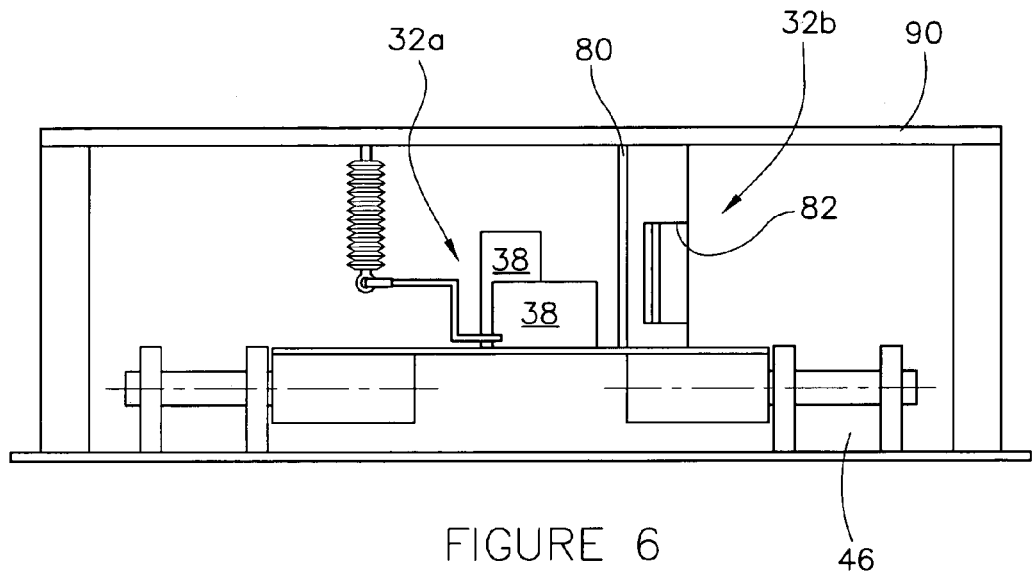
FIG. 6 is a cutaway view showing an electrode according to an exemplary embodiment.

Second electrodes 32*b*, 34*b* are disposed a predetermined distance 62 (FIG. 4) from first electrodes 32*a*, 34*a* respectively. The distance between electrodes 32*a* and 32*b* and the distance between electrodes 34*a* and 34*b* can be the same, or can be different. Referring to FIG. 6 and FIG. 4, second electrodes 32*b*, 34*b* are shown in greater detail. Second electrodes 32*b*, 34*b* comprises a dielectric material 80 defining a U-shaped recess 82. A metal counter electrode 84 is disposed in U-shaped recess 82 and held in a fixed position in part by a casing 86. Dielectric material 80 can comprise polyethylene, silicone, ceramic, glass, Teflon, or other dielectric materials. Recess 82 can be machined into dielectric material 80 and can take any of a variety of shapes. Electrode 84, which can comprise aluminum, is coupled to transformer 17 and is configured to receive a high voltage alternating power from transformer 17 for producing an electrical discharge between electrodes 32a and 32b and between electrodes 34a and 34b. Casing 86 can be silicone or another material configured to encase electrode 84. A protective layer 90 is provided on dielectric material 80 between electrodes 84 and 58, which comprises glass, ceramic, silicone, teflon, plastic, and/or other materials. Layer 90 protects dielectric layer 80 from hot discharge which can corrode dielectric layer 80.

Electrodes 32a, 32b, 34a, 34b are fixed to a base or housing of treatment system 10, which can be a metal rail, frame, or other base or housing. Advantageously, in this embodiment, both first electrodes 32a, 34a and second electrodes 32b, 34b are fixed and non-user-adjustable to provide for improved convenience for the user and because conveyor 30 generally does not require adjustment to treat containers having different sizes and shapes. Electrode pair 32 may be configured the same as or different than electrode pair 34. Further, additional electrode pairs or fewer electrode pairs may be used.

Mask 97 is disposed adjacent to or near wire electrode 58. While mask 97 may take many embodiments, in this embodiment mask 97 is a thin-walled guide mask which is fixed and not user adjustable. Mask 97 can be a non-conductive plastic sheet (e.g., Mylar, PET, etc.), ceramic, or other materials having a high tensile strength, dimensional stability, high electrical insulating properties, and/or resistant to oil, water and ozone.

Masks on electrode guides 106, 108 are generally 10 mills or 20 mils thick and two inches high, but can be greater or less than these dimensions. Preferably, guides 106, 108 have a length that exceeds the length of treatment side 61 of electrodes 32a, 34a respectively.

Figure 5:
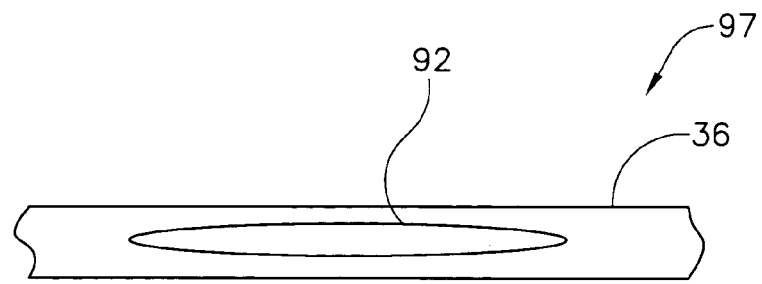
FIG. 5 is a front view of a guide, according to an exemplary embodiment.

As illustrated in FIG. 5, mask 97 can comprise an aperture 72 or electrode cut-out having a length of approximately the length of treatment side 61 of electrode 32a and a narrow width. Aperture or slot 72 provides an opening for electrical discharge to travel from electrode 32a to objects 38. Due to the thin wall of the mask, the mask has a minimum mass, and the discharge will release through aperture 72 onto objects 38. A minimal amount of electrical discharge will occur between electrode 32 and the mask, reducing the wear of the guide mask and loss of electrical discharge treatment.

In some embodiments, electrode guides 106, 108 may further include a friction guide (such as a rubber strip) disposed along the guide such that as object 38 passes along the friction guide, the friction guide tends to cause a side of object 38 not abutting the friction guide to move faster than the side of object 38 abutting the friction guide. This will result in rotation of object 38, especially objects having a substantially round surface area.

Figure 7A:
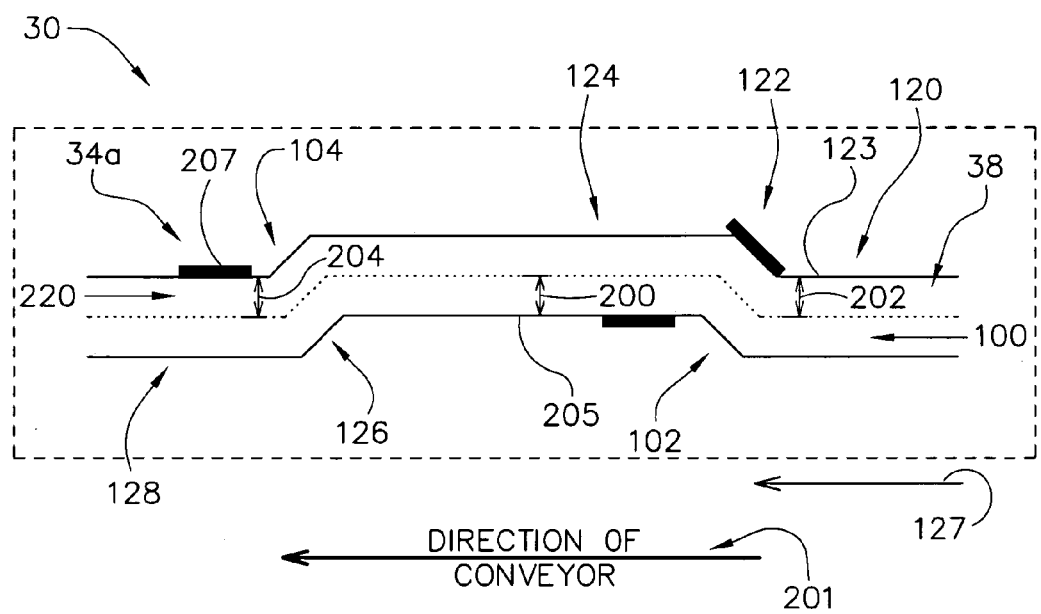
FIGS. 7a–7e are diagrams of system arrangements according to various exemplary embodiments.

Referring to FIG. 7a, positioning guides 102, 104 are positioned such that a narrow object 38 may be able to pass through channel 100 (in the direction of movement of conveyor 30) from first portion 120 of channel 100 to fifth portion 128 of channel 100 without abutting positioning guides 102, 104. Conveyors 30 in FIGS. 7a–d move object 38 in direction 201.

If a straight path 220 exists, the width 200 of path 220 is typically selected to be bigger than the width of a smallest object to be treated by treatment system 10. In other embodiments, width 200 may be at or slightly below the width of a smallest object to be treated by treatment system 10.

Width 202 is defined by the distance between a right surface 123 of first portion 120 and a left surface 205 of third portion 124. Width 204 is defined by left surface 205 of third portion 124 and a right surface 207 of the fifth portion 128. Widths 202 and 204 are each generally selected to be bigger than the width of a smallest object to be treated by treatment system 10. In other embodiments, widths 202 and 204 may be at or slightly below the width of a smallest object to be treated by treatment system 10. Widths 202 and 204 can be selected to be about the same size, but may also be different sizes.

Figure 7B:
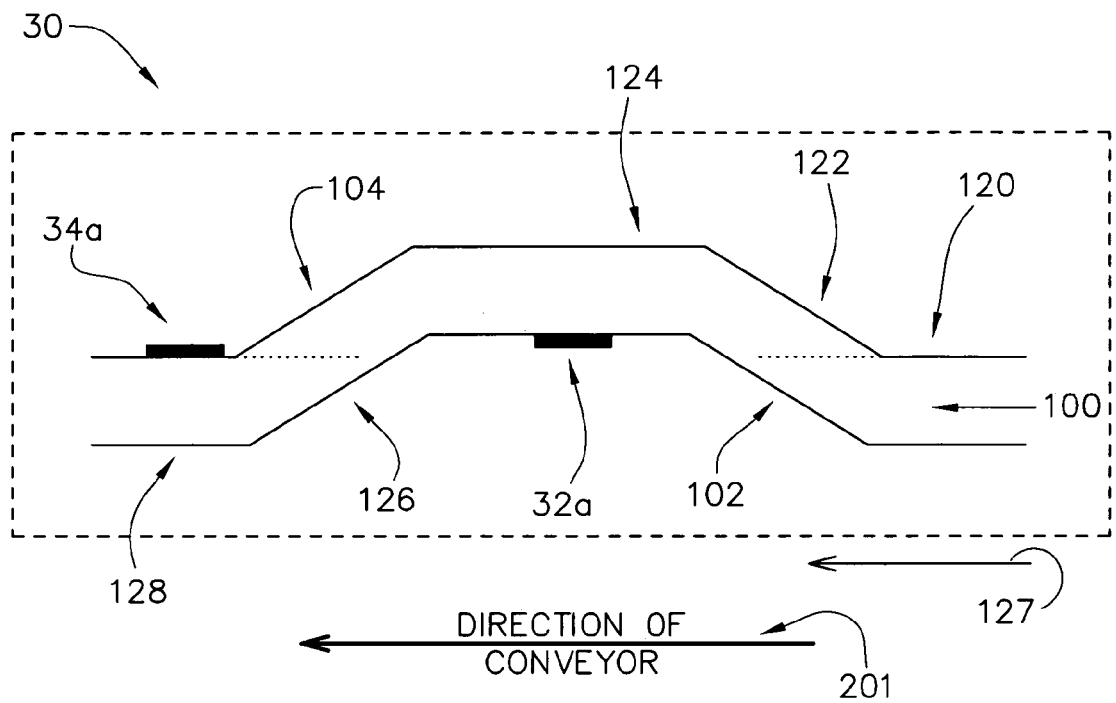

Referring to FIG. 7b, in this alternate embodiment, positioning guides 102, 104 are positioned such that no object 38 may pass through channel 100 from first portion 120 of channel 100 to fifth portion 128 of channel 100 along a conveyor conveying objects 38 in direction 127 without abutting positioning guides 102, 104.

Figure 7C:
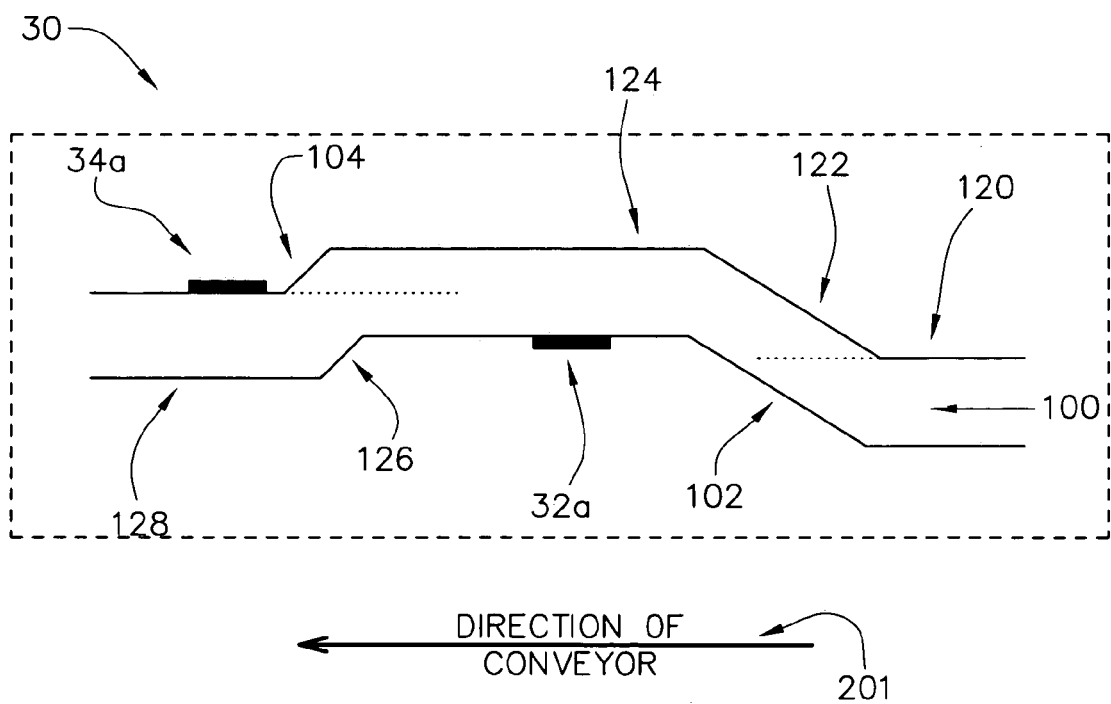

Referring to FIG. 7c, in this alternate embodiment, positioning guides 102, 104 are positioned such that a narrow object 38 may pass through channel 100 (in the direction of movement of conveyor 30) from third portion 124 of channel 100 to fifth portion 128 of channel 100 without abutting positioning guide 104, but may not pass through channel 100 from first portion 120 of channel 100 to third portion 124 of channel 100 without abutting positioning guide 102.

Figure 7D:
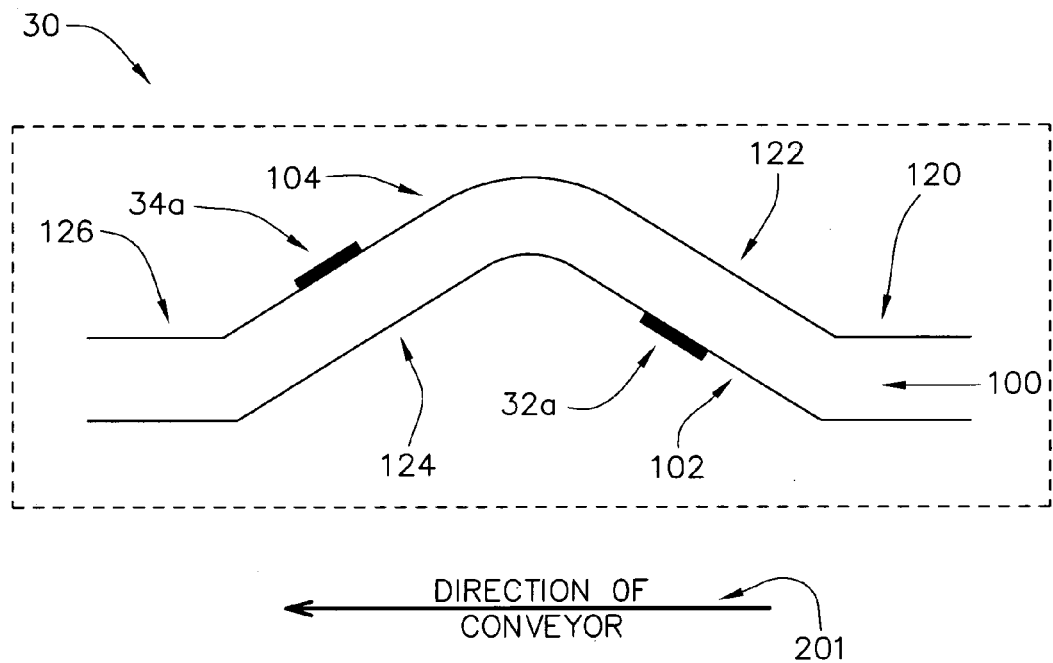

Referring to FIG. 7d, in this alternate embodiment, positioning guides 102, 104 are positioned such that no object 38 may pass through channel 100 from first portion 120 of channel 100 to fourth portion 126 of channel 100 without abutting positioning guides 102, 104. Further, electrode pairs 32, 34 are disposed along positioning guides 102, 104.

Figure 7E:
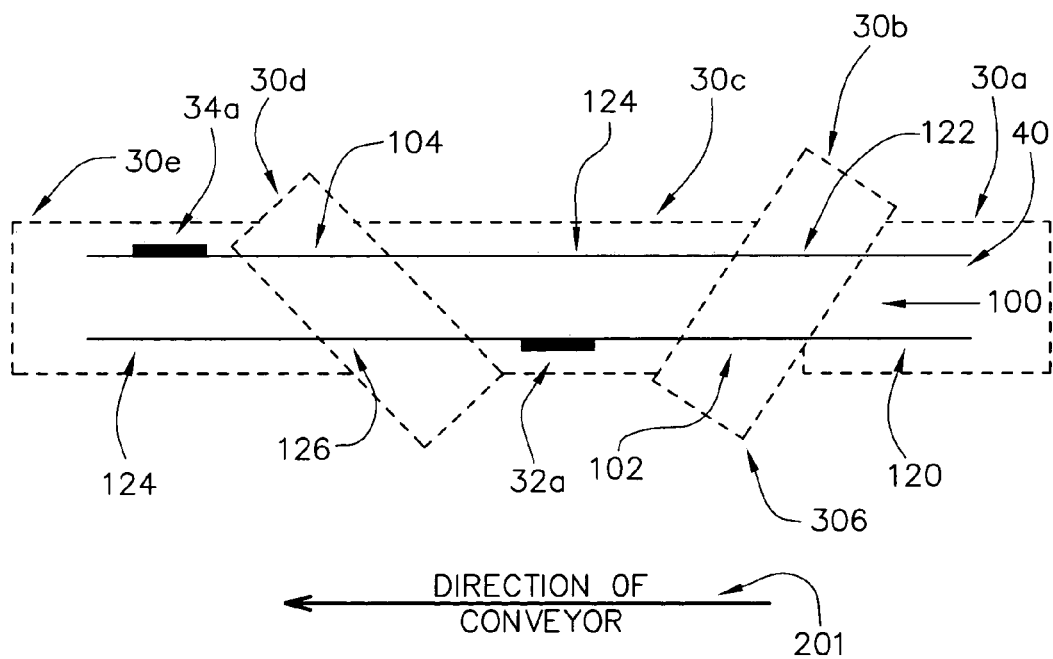

Referring to FIG. 7e, in this alternate embodiment, conveyor 30 includes five conveyors 30a–e. Conveyors 30a, 30c, 30e are configured to move object 38 straight from opening 110 to the exit. Conveyor 30b is configured to move object 38 towards the left of channel 100 in second portion 122. Object 38 will abut positioning guide 102 which will move object 38 laterally to the right with respect to the direction of movement of conveyor 30b (the relevant sub-conveyor for purposes of determining lateral movement at guide 102). Object 38 will then pass electrode 32a at a predetermined distance while moving along conveyor 30c in third portion 124. After passing electrode 32a, conveyor 30d will move object 38 to the right side of channel 100 in fourth portion 126. Object 38 will abut positioning guide 104 which will move object 38 to the left with respect to the direction of movement of conveyor 30d. Object 38 will then enter fifth portion 128 and will pass electrode 34a at a predetermined distance while being moved by conveyor 30e.

Figure 8:
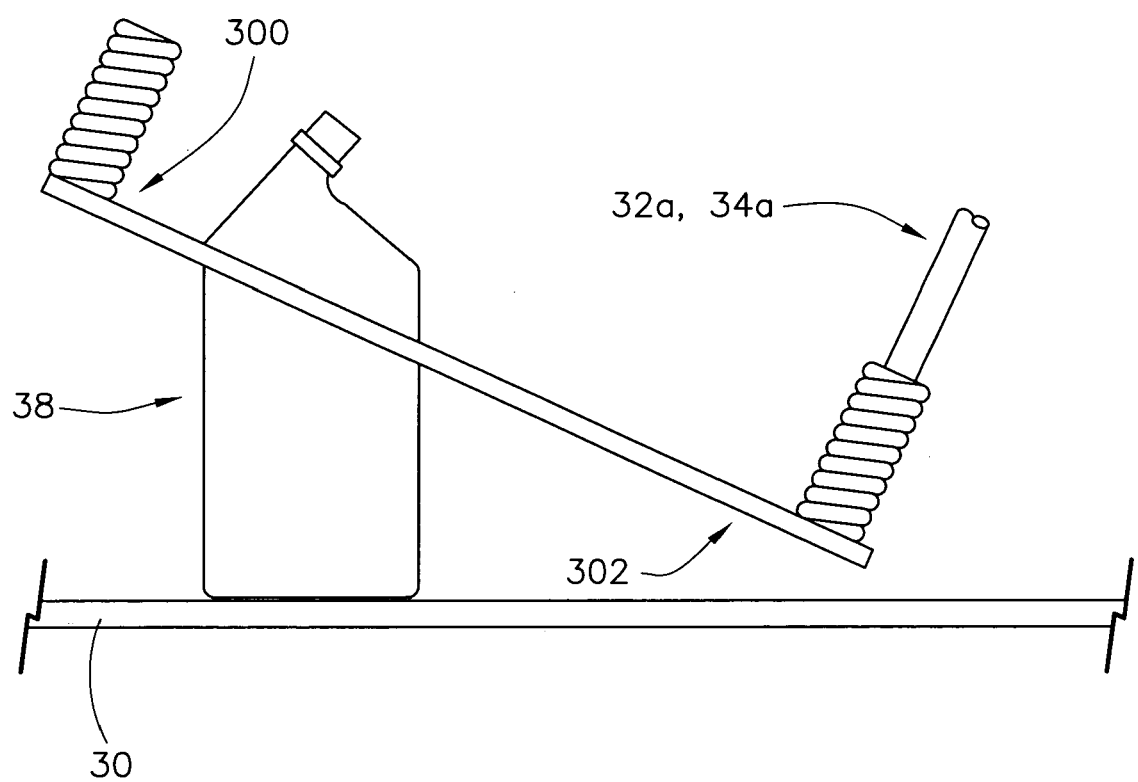
FIG. 8 is a side view of an arrangement of an electrode according to an exemplary embodiment.

Referring to FIG. 8, object 38 is in a substantially upright filling position. As object 38 moves along conveyor 30, electrodes 32a, 34a are able to expose object 38 to an electrical discharge at multiple heights (height measured at planes parallel to conveyor 30). In this embodiment, electrodes 32a, 34a are configured such that the change in height is continuous from a starting height 300 to an ending height 302. This is accomplished by placing electrodes 32a, 34a in a plane that is not coplanar with conveyor 30 (i.e. in a plane that is not parallel to the plane of conveyor 30 while conveyor 30 is in the vicinity of all, or a substantial portion, of electrode 32a or 34a respectively.

In this embodiment, conveyor 30 is substantially horizontal, and electrodes 32a, 34a are not horizontal. In alternate embodiments, conveyor 30 or both conveyor 30 and electrodes 32a, 34a may be non-horizontal. Further, more than one electrode may be used to expose object 38 to an electrical discharge at multiple heights.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. A conveyor system for exposing an object to an electrical discharge to increase the surface tension of a surface of the object, comprising:
 a conveyor configured to convey the object in a first direction;
 a guide configured to guide the object laterally with respect to the first direction;
 a first electrode configured to provide an electrical discharge to a first side of the object; and
 a second electrode configured to provide an electrical discharge to a second side of the object.

2. The system of claim 1, wherein the guide is a first guide and is configured to guide the object laterally in a second direction, the system further comprising a second guide configured to guide the object laterally with respect to the first direction in a third direction that is different than the second direction.

3. The system of claim 2, wherein the first electrode is positioned along the first guide, and the second electrode is positioned along the second guide.

4. The system of claim 1, wherein the first electrode and the second electrode are located on opposite sides of a channel.

5. The system of claim 1, wherein at least one of the first and second electrodes is not coplanar with the conveyor.

6. The system of claim 1, wherein the guide is configured to reposition the object on the conveyor at a predetermined distance from the first electrode.

7. The system of claim 6, wherein the conveyor and the first electrode are not coplanar.

8. The system of claim 7, wherein the second electrode is not coplanar with the conveyor.

9. The system of claim 6, further comprising a second guide configured to reposition the object on the conveyor at a predetermined distance from the second electrode.

10. The system of claim 1, wherein the conveyor is configured to convey the object in a filling position, and at least one of the first electrode and the second electrode is configured such that it provides an electrical discharge to the object while the object is in the filling position.

11. A conveyor system for exposing an object to an electrical discharge to increase the surface tension of a surface of the object, comprising:
 a conveyor configured to convey the object in a first direction;
 a first guide configured to guide the object in a second direction laterally with respect to the first direction;
 a first electrode configured to provide an electrical discharge to a first side of the object; and
 a second electrode configured to provide an electrical discharge to a second side of the object;
 a second guide configured to guide the object laterally with respect to the first direction in a third direction that is different than the second direction;
 a third guide; and
 a fourth guide;
 wherein the first electrode is positioned along the third guide and the second electrode is positioned along the fourth guide; and
 wherein the first guide is configured to guide the object before the third guide, the third guide being configured to guide the object before the second guide, and the second guide being configured to guide the object before the fourth guide.

12. The system of claim 11, wherein the conveyor is configured to convey the object in a filling position, and the first electrode and the second electrode are configured such that they provide an electrical discharge to the object while the object is in the filling position.

13. A conveyor system for exposing an object to an electrical discharge to increase the surface tension of a surface of the object, comprising:
 a conveyor configured to convey the object in a first direction;
 a guide configured to guide the object laterally with respect to the first direction, the guide comprising a surface disposed at a first angle relative to the first direction, the surface configured to guide the object laterally with respect to the first direction;
 a first electrode configured to provide an electrical discharge to a first side of the object, the first electrode being positioned at a second angle relative to the first direction which is different than the first angle; and
 a second electrode configured to provide an electrical discharge to a second side of the object.

14. The system of claim 13, further comprising a second guide, wherein the first electrode is elongated and is positioned along the second guide.

15. The system of claim 14, further comprising a third guide configured to guide the object after it has passed the second guide, wherein the second electrode is positioned along the third guide.

16. The system of claim 15, wherein the guide is a first guide and the surface of the guide disposed at the first angle is a first surface, the first surface being configured to guide the object in a second direction, the system further comprising a fourth guide, the fourth guide having a second surface configured to guide the object laterally with respect to the first direction and in an opposite direction of the second direction.

17. The system of claim 14, wherein the guide is a first guide and the second guide is in a fixed position with respect to the first guide.

18. The system of claim 13, wherein the conveyor comprises a belt.

19. The system of claim 13, wherein the electrical discharge of the first electrode is configured to oxidize a surface of the object to make the surface receptive to at least one of inks and adhesives.

20. The system of claim 13, wherein the second angle is substantially parallel to the first direction.

21. The system of claim 13, wherein the first electrode is not coplanar with the conveyor.

22. The system of claim 13, wherein the guide is configured to reposition the object on the conveyor at a predetermined distance from the first electrode.

23. The system of claim 22, wherein the guide is a first guide and the system further comprises a second guide comprising a surface at an angle which is fixed with respect to the first direction, the second guide configured to guide the object laterally with respect to the first direction.

24. The system of claim 23, further comprising:
 a third guide; and
 a fourth guide;
 wherein the first electrode is positioned along the third guide and the second electrode is positioned along the fourth guide; and wherein the first guide is configured to guide the object before the third guide, the third guide being configured to guide the object before the second guide, and the second guide being configured to guide the object before the fourth guide.

25. A conveyor system for exposing an object to an electrical discharge to increase the surface tension of a surface of the object, comprising:
- a conveyor configured to convey the object in a first direction;
- a first guide configured to guide the object laterally with respect to the first direction;
- a second guide comprising a surface at an angle which is fixed with respect to the first direction, the second guide configured to guide the object laterally with respect to the first direction;
- a first electrode configured to provide an electrical discharge to a first side of the object; and
- a second electrode configured to provide an electrical discharge to a second side of the object.

26. The system of claim 25, wherein the first guide comprises a surface at an angle which is fixed with respect to the first direction.

27. The system of claim 25, wherein the first guide and the second guide are both in fixed positions.

28. The system of claim 25, wherein the guide is configured to reposition the object on the conveyor at a predetermined distance from the first electrode.

29. A conveyor system for exposing an object to an electrical discharge to increase the surface tension of a surface of the object, comprising:
- means for conveying the object in a filling position, comprising a conveyor configured to convey the object in a first direction;
- means for providing an electrical discharge to a first side of the object and a second side of the object while the object is in the filling position, comprising
  - a first electrode configured to provide an electrical discharge to a first side of the object; and
  - a second electrode configured to provide an electrical discharge to a second side of the object;
- means for guiding the object laterally with respect to the means for conveying to a position such that the object may be provided with an electrical discharge, comprising a guide configured to guide the object laterally with respect to the first direction.

30. The conveyor system of claim 29, wherein the means for providing an electrical discharge to a first side of the object and a second side of the object while the object is in the filling position comprises a means for providing an electrical discharge to a first side of the object and a second side of the object while the object is substantially upright.

* * * * *